3,105,076
PYRROLYLPTERIDINE DERIVATIVES
Irwin J. Pachter, Erdenheim, and Joseph Weinstock, Phoenixville, Pa., assignors to Smith Kline & French Laboratories, Philadelphia, Pa., a corporation of Pennsylvania
No Drawing. Filed Nov. 9, 1961, Ser. No. 151,179
4 Claims. (Cl. 260—251.5)

This invention relates to new and novel pyrrolylpteridine compounds having pharmacodynamic, especially diuretic and antihypertensive activity. More specifically, the compounds of this invention are characterized by having a pyrrole moiety substituted at the 6-position of the pteridine nucleus.

The unexpected discovery of the diuretic activity of these compounds is all the more surprising since the closely related 6-pyridyl congeners were found to be completely devoid of such activity.

The compounds of this invention are more specifically described by the following structural formula:

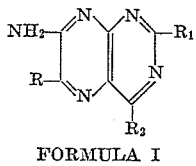

FORMULA I in which:

R represents a pyrrolyl moiety optionally substituted by inert radicals, such as lower alkyl, preferably methyl, methoxy, inert halogen, etc.;

$R_1$ represents phenyl, thienyl, and advantageously, amino, lower alkylamino or dilower alkylamino; and $R_2$ represents amino, lower alkylamino or dilower alkylamino.

The preferred compounds of this invention are those of Formula I in which R is pyrrolyl of 4–5 carbons and $R_1$ and $R_2$ are amino. Especially active diuretic compounds are 6-(1-pyrrolyl)-2,4,7-triaminopteridine and 6-(1-methyl-2-pyrrolyl)-2,4,7-triaminopteridine.

Also included in this invention are the nontoxic, pharmaceutically-acceptable acid addition salts of the bases noted above, such as the salts derived from acetic, hydrochloric, sulfuric, maleic, succinic, phosphoric, ethanedisulfonic, etc., acids. These salts are prepared by dissolving the base in a suitable organic solvent with the acid or in an aqueous acid solution then isolating the salt by filtration, precipitation or evaporation. The compounds of this invention are particularly advantageous in possessing the basic pyrrolyl moiety thereby allowing production of the acid addition salts having relatively greater solubility in aqueous media.

The compounds of this invention are prepared from the condensation of known 5-nitrosopyrimidines with pyrrolylacetonitriles usually at elevated temperatures, i.e., at reflux temperatures, in suitable organic solvents, such as dimethylformamide or dimethylacetamide, in the presence of an alkali metal alkoxide. The condensation of the 2-amino-5-nitrosopyrimidines at times proceeds with difficulty or only under forcing reaction conditions due to the reduced reactivity of the nitroso group of the pyrimidine reactant. Forcing reaction conditions or formation of the N-benzylpyrrolylacetonitriles followed by removal of the protective benzyl moiety by known methods solves this problem. The use of weak bases, such as sodium cyanide or potassium acetate, is often useful with more reactive nitrosopyrimidines.

The pyrrolylacetonitriles are either known to the art or are easily prepared by known methods. For example the 2-pyrrolylacetonitriles are prepared by the Mannich reaction followed by reaction of the quaternary Mannich product with potassium cyanide by the method of Herz et al., J. Am. Chem. Soc., 73 1921 (1951). The 3-pyrrolylacetonitriles are easily produced from the 3-carbomethoxypyrroles by lithium aluminum hydride reduction to the alcohol then conversion to the halide and the desired 3-pyrrolylacetonitrile using the reactions reported by Rapport et al., J. Org. Chem., 26 1102 (1961). The 1-pyrrolylacetonitriles are prepared by the method of Herz et al., J. Org. Chem., 21, 896 (1956).

The terms "lower alkyl" and "lower alkoxy" connote moieties containing not more than 4 carbon atoms.

It will be apparent that the nub of this invention is a series of compounds which an essential 6-pyrrolyl moiety substituted on a pteridine nucleus with essential amino groups at the 4, 7 and, in the advantageous group, 2-positions. Variations of these compounds will be obvious to those skilled in the art and are included in this invention the practice of which the following examples fully teach.

Example 1

The methiodide of 2-dimethylaminomethyl-1-methylpyrrole (41.5 g.) is added portionwise with cooling to a mixture of 10.9 g. of sodium cyanide in 125 ml. of dimethylsulfoxide. The mixture is warmed to 40° C. to initiate a mild exothermic reaction. The reaction mixture is then heated to 90–95° C. for 15 minutes, cooled and poured into 500 ml. of water. Extraction with methylene dichloride gives a brown oil, 1-methyl-2-pyrrolylacetonitrile, which distills at 74–84° C. at 0.6 mm.

A mixture of 3.3 g. of sodium methoxide 10 g. of 1-methyl-2-pyrrolylacetonitrile, 8.6 g. of 5-nitroso-2,4,6-triaminopyrimidine and 175 ml. of dimethylformamide is heated at reflux for one-half hour. After cooling a yellow solid, 6-(1-methyl-2-pyrrolyl)-2,4,7 - triaminopteridine, is recovered.

The pteridine is optionally purified by recrystallization as the acetate salt by dissolving in boiling 1:1 acetic acid-water and cooling. The base from the separated acetate salt is regenerated by stirring with aqueous ammonia, M.P. >330° C.

Example 2

A mixture of 18.4 g. of 5-nitroso-2,4,6-triaminopyrimidine, 7.1 g. of sodium methoxide, 19 g. of 1-pyrrolylacetontirile and 300 ml. of dimethylformamide is heated at reflux for one hour. Cooling gives the desired 6-(1-pyrrolyl)-2,4,7-triaminopteridine.

Purification is carried out by dissolving the pteridine in boiling dilute hydrochloric acid, cooling and filtering to give the hydrochloride salt. This material is taken up in hot water and ammonia is added to separate the base, M.P. >330° C.

Example 3

A mixture of 1.8 g. of 4-dimethylamino-2,6-diamino-5-nitrosopyrimidine (prepared by reacting 4-chloro-2,6-diaminopyrimidine with an excess of dimethylamine, then nitrosating using sodium nitrate and aqueous acetic acid), 0.8 g. of potassium methoxide, 1.8 g. of 1-methyl-2-pyrrolylacetonitrile and 75 ml. of dimethylacetamide is heated at reflux for two hours. Cooling separates crude 4 - dimethylamino - 6 - (1 - methyl - 2 - pyrrolyl) - 2,7-diaminopteridine.

Substituting butylamine in the above reaction to give 4-butylamino-2,6-diamino-5-nitrosopyrimidine then reacting with 1-pyrrolylacetonitrile gives 4-butylamino-6-(1-pyrrolyl) - 2,7 - diaminopteridine. Substituting diethylaminoethylamine gives the corresponding 4-diethylaminoethylamino congener.

Example 4

A mixture of 1.9 g. of 4,6-diamino-2-dimethylamino-5-nitrosopyrimidine (prepared by reacting 4,6-diamino-2-methylthio-5-nitrosopyrimidine with dimethylamine in butanol at reflux), 0.9 g. of sodium ethoxide, 1.8 g. of 1-methyl-2-pyrrolylacetonitrile and 100 ml. of dimethylformamide is heated at reflux for three hours. Working up as in Example 1 gives the desired 4,7-diamino-2-dimethylamino-6-(1-methyl-2-pyrrolyl)-pteridine.

Substituting methylamine and a closed reaction vessel in the above reaction the 2-methylaminopyrimidine and subsequently 4,7-diamino-2-methylamino-6-(1-methyl-2-pyrrolyl)-pteridine are obtained.

Example 5

A mixture of 5 g. of 2-phenyl-4,6-diamino-5-nitrosopyrimidine, 5 g. of 2-pyrrolylacetonitrile and 100 ml. of ethanol with 2.5 g. of sodium cyanide and 25 ml. of water is prepared and heated at reflux for one hour. The cooled mixture after standing overnight, is filtered to give a solid which is washed well with water.

This material is purified by boiling in 400 ml. of 1:1 water-acetic acid and filtering. The filtrate was heated with charcoal, then cooled and neutralized to give yellow crystals of 4,7-diamino-6-(2-pyrrolyl)-2-phenyl-pteridine, M.P. >300° C.

Example 6

A mixture of 2.6 g. of 2-(α-thienyl)-4,6-diamino-5-nitrosopyrimidine (U.S. Patent No. 2,963,479), 2.5 g. of 1-pyrrolylacetonitrile in 50 ml. of ethanol with 1.3 g. of of sodium cyanide in 15 ml. of water is prepared and reacted at reflux to give 4,7-diamino-6-(1-pyrrolyl)-2-(α-thienyl)-pteridine.

Substituting the β-thienylpyrimidine gives the 2-(β-thienyl) analogue. Substituting 6-amino-4-methylamino-5-nitroso-2-phenylpyrimidine and 1-methyl-2-pyrrolylacetonitrile above in equimolar amounts gives 7-amino-4-methylamino-2-phenyl-6-(1-methyl-2-pyrrolyl)-pteridine.

Example 7

A mixture of 1 g. of 2-phenyl-4,6-diamino-5-nitrosopyrimidine, 1.2 g. of 2-methyl-4-pyrrolylacetonitrile (Beilstein, 22 II 18) and 0.6 g. of sodium acetate in aqueous ethanol is reacted as in Example 5 to give the desired 4,7-diamino-6-(2-methyl-4-pyrrolyl)-2-phenylpteridine.

Example 8

A mixture of 1 g. of 2,4,6-triamino-5-nitrosopyrimidine, 1.3 g. of 1,2-dimethyl-5-pyrrolylacetonitrile (prepared by the Mannich reaction on 1,2-dimethylpyrrole as in Herz, loc. cit.) and 0.6 g. of sodium methoxide in 75 ml. of dimethylformamide is reacted and worked up as in Example 1 and gives crude 6-(1,2-dimethyl-5-pyrrolyl)-2,4,7-triaminopteridine.

Example 9

1-benzyl-3-carbomethoxypyrrole is prepared by alkylation of 3-carbomethoxypyrrole with benzyl chloride and sodium carbonate. The ester moiety is reduced using lithium aluminum hydride in ether to give 3-pyrrolylmethanol which is converted to 1-benzyl-3-pyrrolylmethyl chloride with concentrated hydrochloric acid, then to the cyanide with potassium cyanide.

A mixture of 1.5 g. of 2,4,6-triamino-5-nitrosopyrimidine, 1.6 g. of 1-benzyl-3-pyrrolylacetonitrile and 0.8 g. of sodium methoxide in 100 ml. of dimethylformamide is reacted and worked up as in Example 1 to give 6-(1-benzyl-3-pyrrolyl)-2,4,7-triaminopteridine.

This material (2.1 g.) in warm methanoldimethylformamide is hydrogenated using a metal hydrogenation catalyst, such as palladium-on-carbon. The filtered reaction mixture is partially evaporated in vacuo and cooled to give the desired 6-(3-pyrrolyl)-2,4,7-triaminopteridine.

What is claimed is:
1. A chemical compound of the formula:

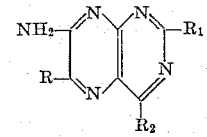

in which:
R is a member selected from the group consisting of pyrrolyl, methylpyrrolyl and dimethylpyrrolyl;
R₁ is a member selected from the group consisting of amino, lower alkylamino, dilower alkylamino, phenyl and thienyl; and
R₂ is a member selected from the group consisting of amino, lower alkylamino and dilower alkylamino.
2. 6-(1-methyl-2-pyrrolyl)-2,4,7-triaminopteridine.
3. 6-(1-pyrrolyl)-2,4,7-triaminopteridine.
4. 6-(1-methyl-2-pyrrolyl)-2,4,7-triaminopteridine acetic acid salt.

References Cited in the file of this patent

Gilman et al.: J. Amer. Chem. Soc., volume 47 (1925), pages 245–54.

Spickett et al.: J. Chem. Soc., London (1954), pages 2887–95.